W. F. LUM.
Bag Holder.
No. 112,727. Patented Mar. 14, 1871.
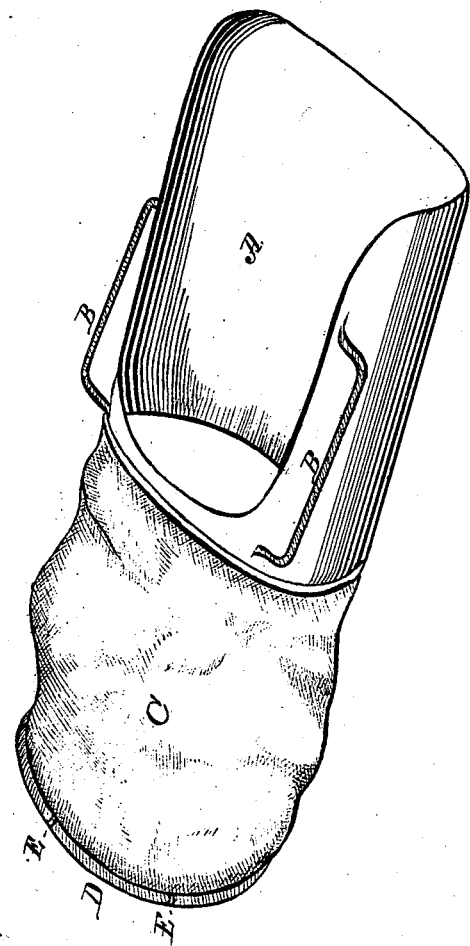
Witnesses
Charles Chinn
Edwin J. McLain
Inventor
William F. Lum
By N. Crawford
atty

United States Patent Office.

WILLIAM F. LUM, OF WATERLOO, WISCONSIN.

Letters Patent No. 112,727, dated March 14, 1871.

IMPROVEMENT IN COMBINED BAG-HOLDERS AND FILLERS.

The Schedule referred to in these Letters Patent and making part of the same.

I, WILLIAM F. LUM, of Waterloo, in the county of Jefferson, in the State of Wisconsin, have made certain Improvements in Bag-Holders and Fillers, of which the following is a specification.

The object of this invention is to furnish a cheap device for not only holding but filling a bag with grain or other substances; and It consists in the construction of the shovel or filler and its attachment to a flexible tube or slack bag, and that to the holder, that is inserted into the mouth of the bag that is to be filled.

The flexible or slack bag C may be omitted, if desired, and the shovel A be placed and secured in the mouth of the bag to be filled, or by sliding the bag to be filled onto the shovel, so that the operator can hold it with the handles of the shovel and operate it.

In the drawing—

A represents a wooden or metal shovel or filler, of the proper shape and size to easily scoop up the grain and empty it into the bag. The front part of this shovel A is flat, or nearly flat, on its under side, so as to take up the grain that lies upon a floor, while the upper side is cut away, leaving the sides sufficiently high to hold the grain in the shovel, the sides continuing to near the rear end of the shovel, when they are curved upward, and leave the rear end for a short distance of a cylindrical shape or form and open at its rear end.

B B are handles, firmly attached to the sides of the shovel, and by which the shovel is operated.

C is a flexible tube or slack bag, securely attached to the rear end of the shovel A by embracing the shovel within it, or in any other safe and convenient manner. This tube or slack bag may be of any desired length, and can be made to have a greater diameter at its rear end than where it surrounds the shovel, and it may be made of any material that is flexible and durable.

D is a hoop, that enters into the mouth of the bag to be filled and holds it open to receive the grain. It may be of either metal, wood, or other suitable material, and of a circular shape in cross-section, and of the size to just freely enter the bag to be filled. It can also be made to be adjustable in size to accommodate bags of different diameters.

To this hoop or bag-holder the rear end of the flexible tube or slack bag C is securely attached by any cheap and suitable method.

From this hoop or holder D project a sufficient number of metal hooks, E, to securely attach the bag to be filled to the holder.

The operation of filling bags by this device is as follows:

The operator first fixes the bag to be filled on the holder D by hooking the mouth of the bag onto the hooks E, which secures it to the holder and filler; he then seizes the shovel-handles B with his hands, advances forward and pushes the shovel into the grain in a horizontal position, filling the shovel full; he then elevates the front or forward end of the shovel, and the grain falls back, through the circular aperture in the rear end of the shovel, into the flexible tube or slack bag, and the shovel is empty and ready to be forced forward again into the grain for another scoopfull, and so on, repeating the operation till the bag to be filled is full to its mouth, only requiring the bag and the holder to be elevated or raised up once or twice in order to get it full and compact. One man can readily operate the device and successfully fill bags to their fullest capacity.

The device is simple in operation and cheap in construction.

Having thus described my invention,

What I claim, and desire to secure by Letters Patent, is—

1. The shovel A, having handles, B, in combination with the flexible tube or slack bag C and holder D, having hooks, E, in the manner herein described.

2. The shovel or bag-filler A, having handles, B, when constructed in the manner and for the purpose described.

3. The bag-filler and holder herein described, as a new article of manufacture.

WILLIAM F. LUM.

Witnesses:
JAS. SHELDON,
B. PHELPS.